(12) United States Patent
Jung et al.

(10) Patent No.: US 11,636,762 B2
(45) Date of Patent: Apr. 25, 2023

(54) IMAGE DISPLAY DEVICE

(71) Applicant: Toyota Jidosha Kabushiki Kaisha, Toyota (JP)

(72) Inventors: Hojung Jung, Susono (JP); Hiromitsu Urano, Numazu (JP); Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 16/933,152

(22) Filed: Jul. 20, 2020

(65) Prior Publication Data
US 2021/0027625 A1 Jan. 28, 2021

(30) Foreign Application Priority Data

Jul. 23, 2019 (JP) .............................. JP2019-135626

(51) Int. Cl.
*G05D 1/00* (2006.01)
*G08G 1/0968* (2006.01)
*H04N 5/272* (2006.01)
*G08G 1/0962* (2006.01)
*B60W 60/00* (2020.01)

(52) U.S. Cl.
CPC ..... *G08G 1/096855* (2013.01); *G05D 1/0038* (2013.01); *G08G 1/09626* (2013.01); *H04N 5/272* (2013.01); *B60W 60/0025* (2020.02)

(58) Field of Classification Search
CPC ......... G08G 1/096855; G08G 1/09626; G08G 1/123; G08G 1/052; G05D 1/0038; G05D 2201/0213; G05D 1/0044; H04N 5/272; B60W 60/0025

USPC ...................................................... 701/2, 408
See application file for complete search history.

(56) References Cited

U.S. PATENT DOCUMENTS

| 10,233,021 | B1 * | 3/2019 | Brady ................. G05D 1/0282 |
| 10,481,606 | B1 * | 11/2019 | Wengreen ............ G05D 1/0214 |
| 10,906,532 | B2 * | 2/2021 | Lee ..................... G05D 1/0061 |
| 2005/0027448 | A1 * | 2/2005 | Takenaga ........... G08G 1/09675 340/995.13 |
| 2005/0090974 | A1 | 4/2005 | Hirose |

(Continued)

FOREIGN PATENT DOCUMENTS

| CN | 1611918 A | 5/2005 | |
| CN | 111094097 A * | 5/2020 | ............ B60W 30/00 |

(Continued)

*Primary Examiner* — B M M Hannan
(74) *Attorney, Agent, or Firm* — Dinsmore & Shohl LLP

(57) ABSTRACT

An image display device includes: an external sensor data acquisition unit acquired external sensor data detected at a first time point; an internal sensor data acquisition unit acquired internal sensor data detected at the first time point; a determination unit determined a position of the vehicle at a second time point that is a future time point after a predetermined time has elapsed from the first time point, based on the internal sensor data at the first time point; and a display control unit displayed a monitoring image indicating surroundings of the vehicle on the display unit based on the external sensor data at the first time point, wherein, the display control unit superimposes an object indicating the position of the vehicle at the second time point at the position on the monitoring image corresponding to the position of the vehicle at the second time point.

4 Claims, 10 Drawing Sheets

(56) References Cited

U.S. PATENT DOCUMENTS

| | | | | |
|---|---|---|---|---|
| 2012/0032952 A1* | 2/2012 | Lee | ............. | H04N 13/376 |
| | | | | 345/419 |
| 2012/0109409 A1* | 5/2012 | Hara | ............. | B60L 53/16 |
| | | | | 701/1 |
| 2012/0136510 A1* | 5/2012 | Min | ............. | G01S 17/88 |
| | | | | 701/2 |
| 2012/0265431 A1* | 10/2012 | Hayakawa | ............. | B60W 10/18 |
| | | | | 701/301 |
| 2015/0134234 A1* | 5/2015 | Kim | ............. | B60W 30/165 |
| | | | | 701/408 |
| 2015/0213719 A1* | 7/2015 | Lee | ............. | G01C 21/34 |
| | | | | 701/1 |
| 2016/0343249 A1* | 11/2016 | Gao | ............. | G08G 1/096775 |
| 2018/0181118 A1 | 6/2018 | Yoneda et al. | | |
| 2018/0307923 A1* | 10/2018 | Takagi | ............. | G06V 40/10 |
| 2018/0354506 A1* | 12/2018 | Minemura | ............. | G01S 13/867 |
| 2019/0111874 A1* | 4/2019 | Harada | ............. | G01S 13/589 |
| 2019/0137290 A1* | 5/2019 | Levy | ............. | G05D 1/0088 |
| 2019/0155293 A1* | 5/2019 | Oniwa | ............. | G01C 21/20 |
| 2019/0179305 A1* | 6/2019 | Magzimof | ............. | G05D 1/0038 |
| 2019/0258245 A1* | 8/2019 | Nakamura | ............. | B62D 1/00 |
| 2019/0351900 A1* | 11/2019 | Matsuda | ............. | B60W 60/0011 |
| 2020/0086793 A1* | 3/2020 | Watanabe | ............. | H04N 5/272 |
| 2020/0240799 A1* | 7/2020 | Gao | ............. | G01C 21/3438 |

FOREIGN PATENT DOCUMENTS

| | | | | |
|---|---|---|---|---|
| EP | 3339999 A2 * | 6/2018 | ............. | B60W 30/00 |
| JP | 2010134499 A * | 6/2010 | | |
| JP | 2018-106676 A | 7/2018 | | |
| JP | 2018-180771 A | 11/2018 | | |
| JP | 2020513621 A * | 5/2020 | ............. | G05D 1/0038 |
| WO | WO-2020202379 A1 * | 10/2020 | ............. | G05D 1/0022 |

* cited by examiner

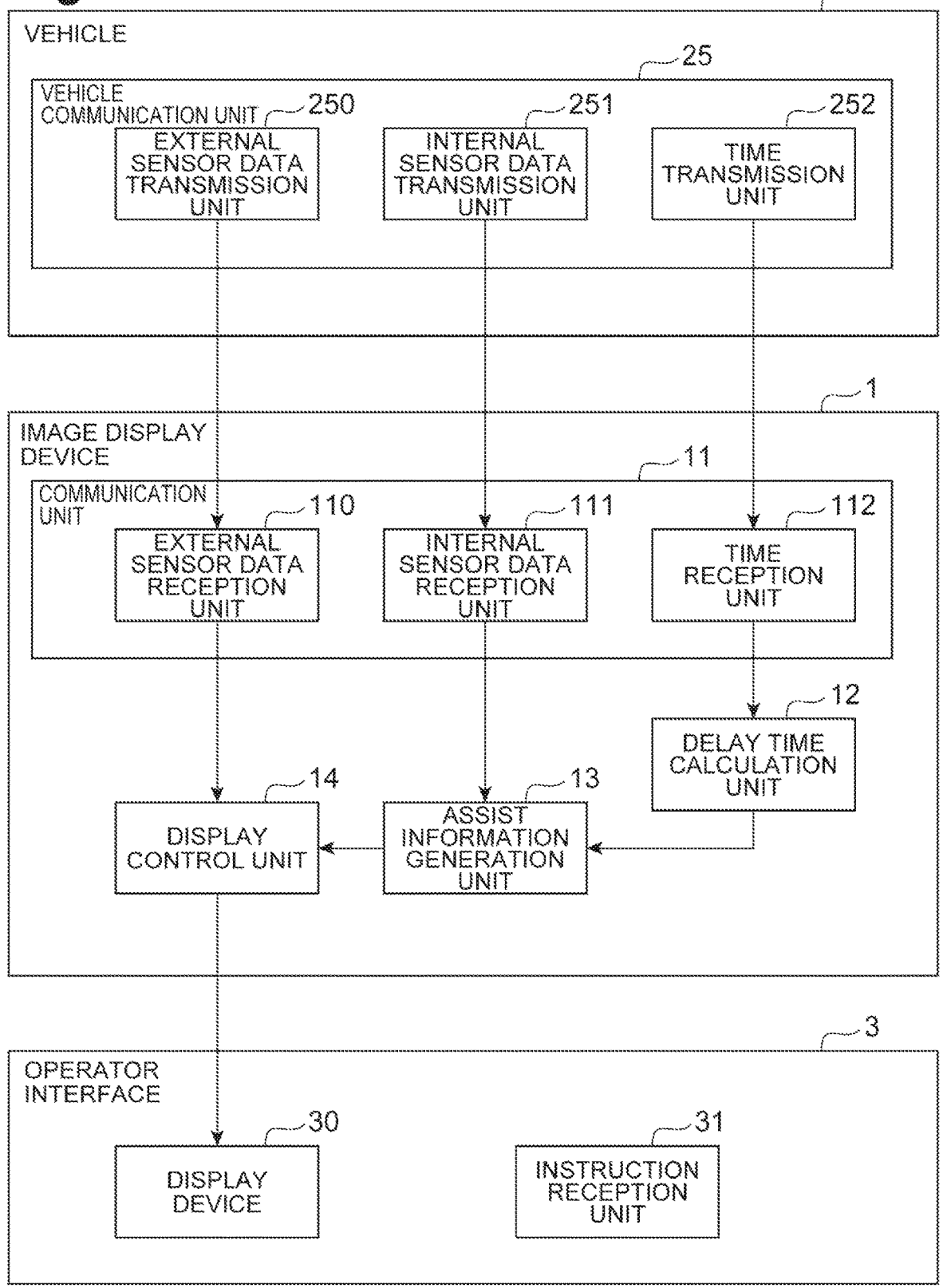

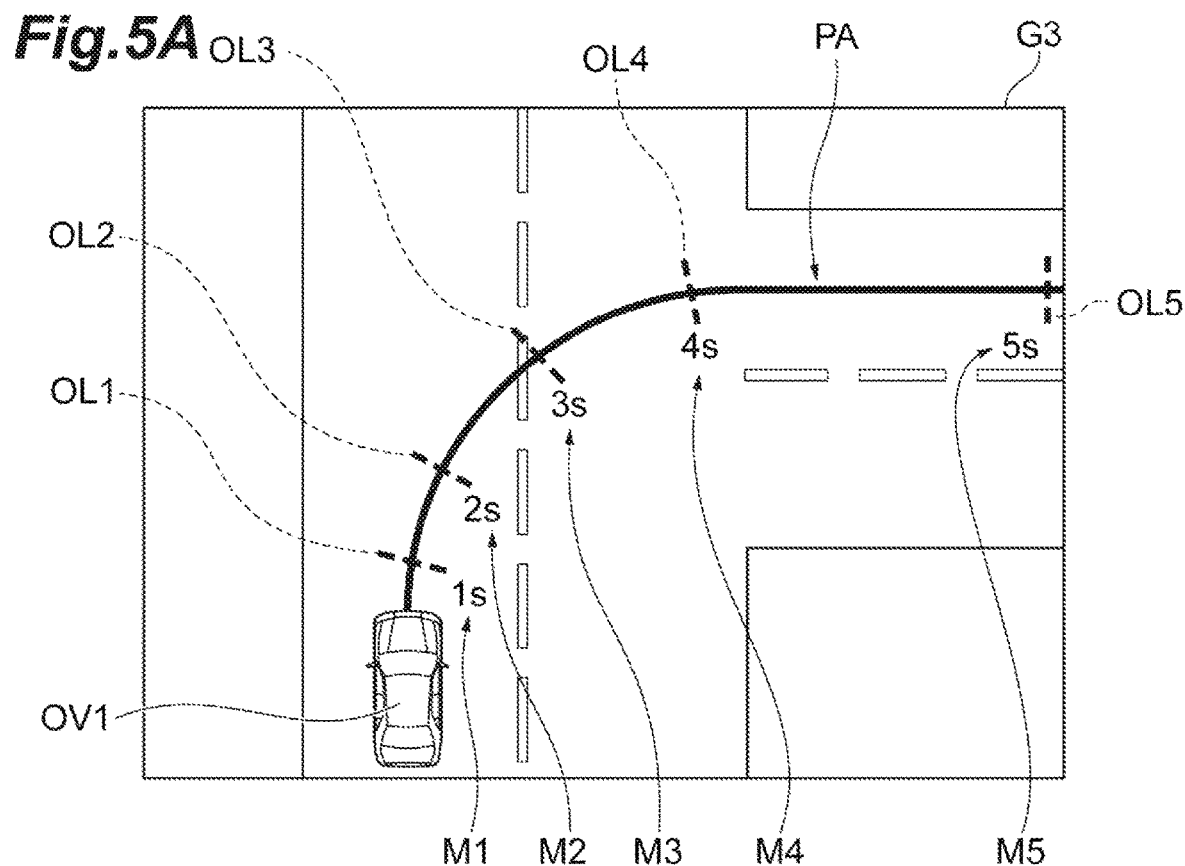
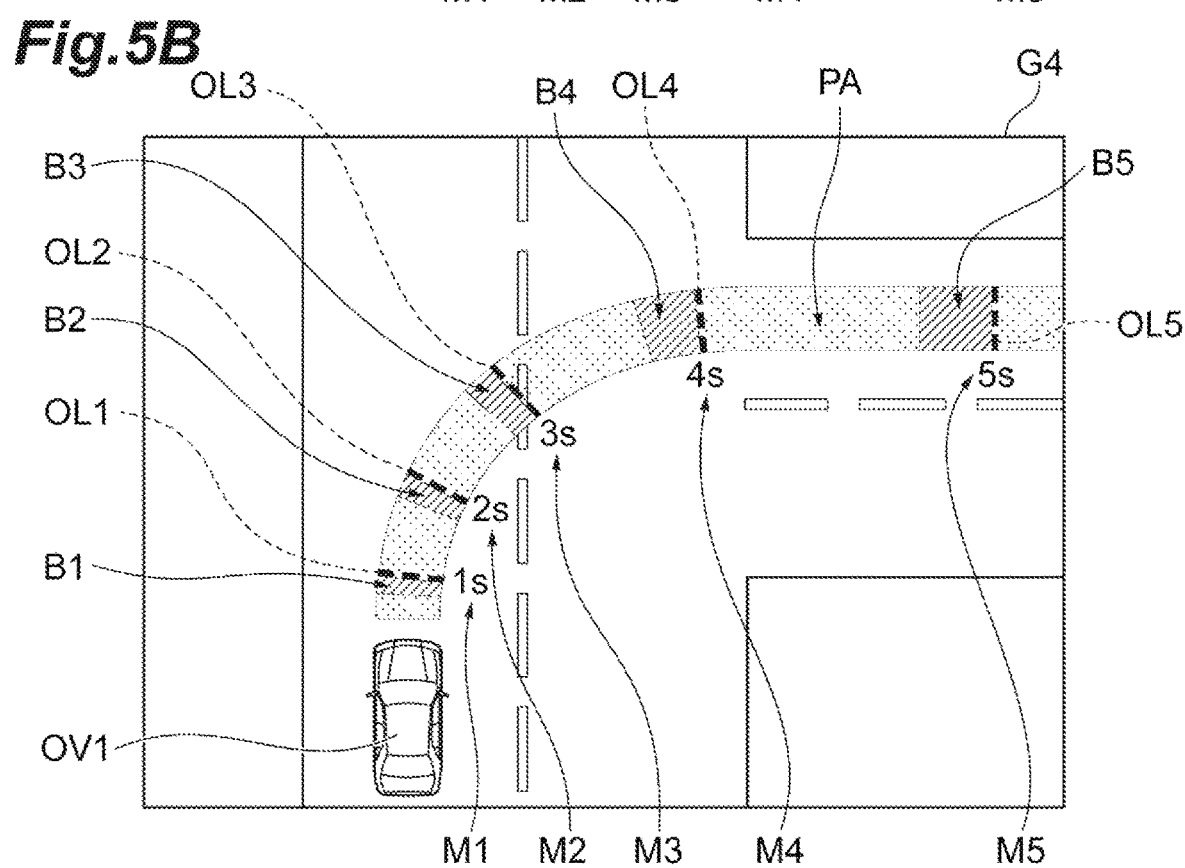

IMAGE DISPLAY DEVICE

CROSS-REFERENCE TO RELATED APPLICATIONS

This application is based on and claims the benefit of priority from Japanese Patent Application No. 2019-135626 filed on Jul. 23, 2019, and the entire contents of which are incorporated herein by reference.

TECHNICAL FIELD

The present disclosure relates to an image display device.

BACKGROUND

Japanese Unexamined Patent Publication No. 2018-180771 discloses a device that displays a camera image on a remote operator based on camera image data received from an autonomous driving vehicle capable of a remote instruction. This device displays the camera image in which information relating to the traveling of the vehicle is superimposed, on the display unit.

SUMMARY

The remote operator confirms the camera image displayed on the display unit and performs a remote instruction on the autonomous driving vehicle. The device disclosed in Japanese Unexamined Patent Publication No. 2018-180771 has needs for improvement from the viewpoint of notifying the remote operator of more appropriate information as a material for determination. The present disclosure provides an image display device that can notify a remote operator of appropriate information.

An image display device according to an aspect of the present disclosure is connected to a display unit that displays information to a remote operator that remotely instructs a vehicle. The image display device includes: an external sensor data acquisition unit configured to acquire external sensor data detected at a first time point by an external sensor that acquires information on an external environment of the vehicle from the vehicle via communication; an internal sensor data acquisition unit configured to acquire internal sensor data detected at the first time point by an internal sensor that acquires a travel state of the vehicle from the vehicle via communication; a determination unit configured to determine a position of the vehicle at a second time point that is a future time point after a predetermined time has elapsed from the first time point, based on the internal sensor data at the first time point; and a display control unit configured to display a monitoring image indicating surroundings of the vehicle on the display unit based on the external sensor data at the first time point. The display control unit is configured to superimpose an object indicating the position of the vehicle at the second time point at a position on the monitoring image corresponding to the position of the vehicle at the second time point determined by the determination unit.

In the image display device according to an aspect of the present disclosure, the position of the vehicle at the second time point is calculated based on the internal sensor data at the first time point detected by the internal sensor of the vehicle. The calculated position of the vehicle at the second time point is displayed on the monitoring image displayed based on the external sensor data at the first time point in a superimposed manner as an object to be provided to the remote operator. For this reason, the image display device can notify the remote operator of the information that can be used for determining whether or not to maintain the vehicle state at the first time point up to the second time point.

In an embodiment, the image display device may further include a calculation unit configured to calculate a delay time of communication with the vehicle. The determination unit may be configured to determine an acceptable range of the position of the vehicle at the second time point based on the delay time, and the display control unit may be configured to superimpose an object indicating the range at a position on the monitoring image corresponding to the range. In this case, the image display device can notify the remote operator of an occurrence of the communication delay and the effect of the delay on the position of the vehicle at the second time point.

In an embodiment, the display control unit may be configured to superimpose the object indicating the range at the position on the monitoring image corresponding to the range when a degree of delay defined based on at least one of an absolute value of the delay time and a variance value within a predetermined time and indicating that the delay increases as a value increases, is equal to or greater than a threshold value. In this case, the image display device does not notify the remote operator when the degree of delay is small, and can notify the remote operator when the degree of delay is large.

In an embodiment, the object indicating the position of the vehicle at the second time point may be a guideline object, the object indicating the range may be an object extending in the line width direction of the guideline object, and the display control unit may be configured to increase the length of the object indicating the range in the line width direction as the degree of delay increases. In this case, the image display device can notify the remote operator of the degree of delay using the guideline object and an object extending in the line width direction.

In an embodiment, the determination unit may be configured to detect another vehicle existing around the vehicle based on the external sensor data at the first time point, and to determine a position of the other vehicle at the second time point. The display control unit may be configured to superimpose an object indicating the position of the other vehicle at the second time point at a position on the monitoring image corresponding to the position of the other vehicle at the second time point determined by the determination unit. In this case, the image display device can notify the remote operator of the position of the other vehicle at the second time point.

According to the present disclosure, an image display device that can notify a remote operator of appropriate information is provided.

BRIEF DESCRIPTION OF THE DRAWINGS

FIG. 3 is a block diagram illustrating functions of the image display device.

FIG. 5A is another example of a monitoring image in which guideline objects are superimposed.

FIG. 5B is another example of a monitoring image in which the guideline object and the object indicating the delay are superimposed.

DETAILED DESCRIPTION

Hereinafter, embodiments will be described with reference to the drawings. In the description below, the same reference signs will be given to the same or corresponding elements, and description thereof will not be repeated.

Figure 1:
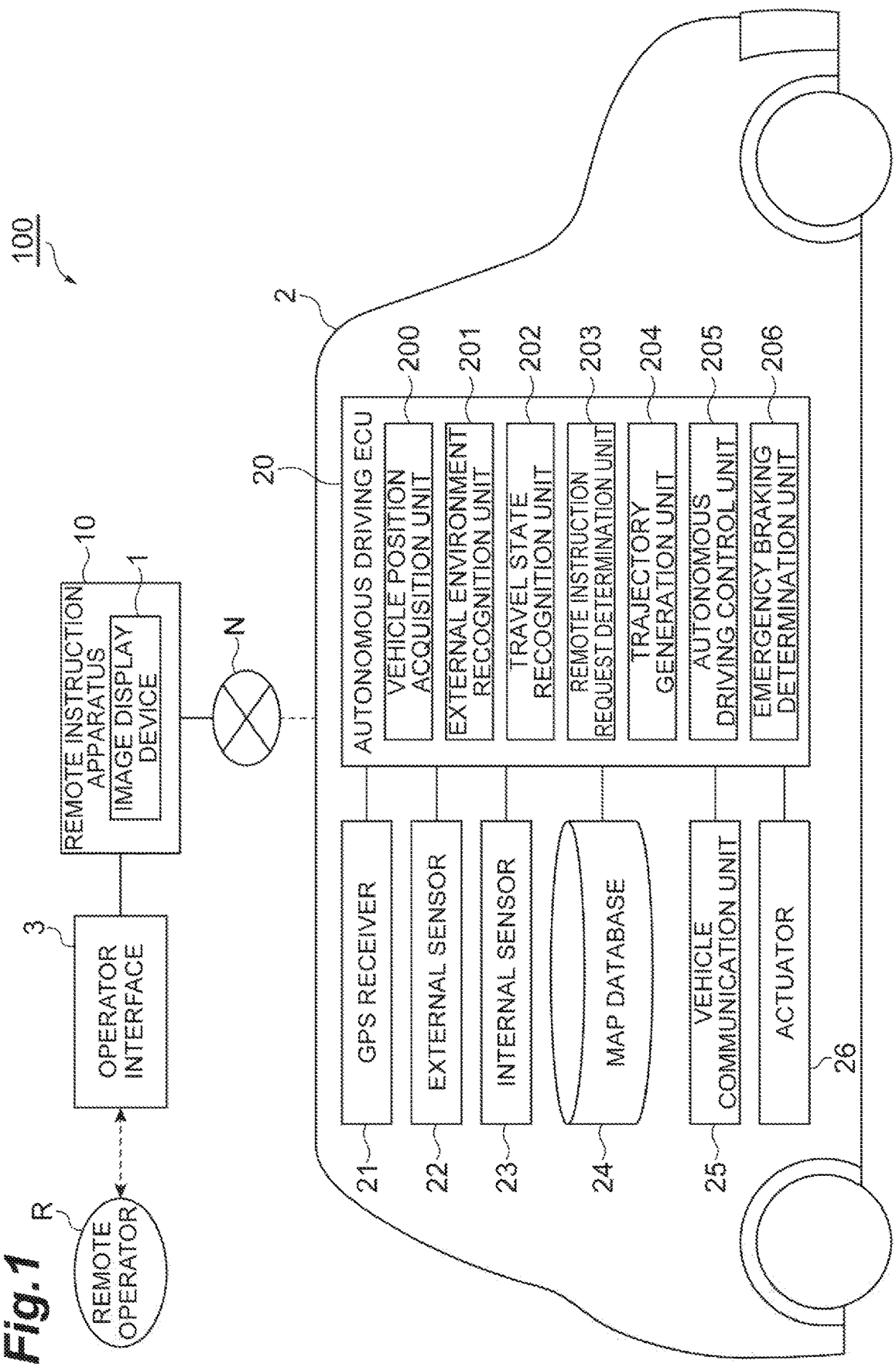
FIG. 1 is a diagram illustrating an outline of a vehicle remote instruction system that includes an image display device according to an embodiment.

FIG. 1 is a diagram illustrating an outline of a vehicle remote instruction system that includes an image display device according to an embodiment. An image display device 1 illustrated in FIG. 1 is included in a vehicle remote instruction system 100. The vehicle remote instruction system 100 is a system that operates a vehicle 2 based on a remote instruction from a remote operator R. The remote instruction is an instruction by the remote operator R relating to a behavior of the vehicle 2. The vehicle 2 is not particularly limited, but is a vehicle that travels by autonomous driving, for example. Hereinafter, the description will be made assuming that the vehicle 2 is a vehicle having an autonomous driving function. The remote instruction may include at least one of an instruction to start a right turn at an intersection, an instruction to start to enter an intersection with a traffic signal, an instruction to start to enter an intersection having poor visibility, an instruction to start a lane change, an instruction to start offset avoidance from an obstacle ahead, and an emergency evacuation. In addition, the remote instruction may include an instruction for starting a parked state vehicle 2. In addition, the remote instruction may include an instruction for starting a stop state vehicle 2 when a pedestrian or the like is detected around the vehicle 2. The remote instruction may include an instruction (for example, an instruction to automatically open and close a door, an instruction to start voice guidance for getting off) for an occupant to get on and off the vehicle 2.

Configuration of Vehicle Remote Instruction System

As illustrated in FIG. 1, the vehicle remote instruction system 100 includes a remote instruction apparatus 10. The remote instruction apparatus 10 includes the image display device 1 and is connected to an operator interface 3. The operator interface 3 displays information on the remote operator R under the control by the image display device 1. The operator interface 3 receives a remote instruction from the remote operator R and outputs the instruction to the remote instruction apparatus 10. The remote instruction apparatus 10 is communicably connected to the vehicle 2 via a network N. The network N is a wireless communication network. The remote instruction apparatus 10 receives various information from the vehicle 2. The remote instruction apparatus 10 may be communicably connected to another vehicle via the network N.

In the vehicle remote instruction system 100, for example, the remote operator R is requested to input the remote instruction in response to a remote instruction request from the vehicle 2. The remote operator R inputs the remote instruction to the operator interface 3. The remote instruction apparatus 10 transmits the remote instruction to the vehicle 2 through the network N. The vehicle 2 automatically travels according to the remote instruction.

In the vehicle remote instruction system 100, the number of remote operators R is not limited, and may be one or may be equal to or more than two. The number of vehicles 2 that can communicate with the vehicle remote instruction system 100 is not particularly limited. A plurality of remote operators R may perform the remote instruction on one vehicle 2, or one remote operator R may perform the remote instruction on equal to or more than two vehicles 2.

As an example, the vehicle 2 includes an autonomous driving electronic control unit (ECU) 20. The autonomous driving ECU 20 is an electronic control unit including a central processing unit (CPU), a read only memory (ROM), a random access memory (RAM), and the like. In the autonomous driving ECU 20, for example, various functions are realized by loading a program recorded in the ROM into the RAM and executing the program loaded in the RAM by the CPU. The autonomous driving ECU 20 may be configured with a plurality of electronic units. The autonomous driving ECU 20 is communicably connected to a global positioning system (GPS) receiver 21, an external sensor 22, an internal sensor 23, a map database 24, a vehicle communication unit 25, and an actuator 26.

The GPS receiver 21 is a device that receives signals from equal to or more than three GPS satellites. The GPS receiver 21 measures a position of the vehicle 2 (for example, latitude and longitude of the vehicle 2) based on the received signals. The GPS receiver 21 outputs the information relating to the measured position. The GPS receiver 21 also outputs the GPS time measured by the GPS time system.

The external sensor 22 is a sensor that detects information on the external environment of the vehicle 2. The external sensor 22 outputs a result of detection as external sensor data. The external sensor 22 includes a camera. The camera is an imaging device that images the external environment of the vehicle 2. The camera outputs image data relating to the external environment of the vehicle 2. The image data is information from which the image can be drawn. For example, the camera is provided on the inside of a windshield of the vehicle 2 and images the front of the vehicle. The camera may be a monocular camera or may be a stereo camera. A plurality of cameras may be provided, and the left and right sides and the rear of the vehicle 2 may be imaged in addition to the front of the vehicle 2.

The external sensor 22 may include a radar sensor. The radar sensor is a detection device that detects objects around the vehicle 2 using at least one of radio waves (for example, millimeter waves) and light. The radar sensor includes, for example, at least one of millimeter wave radar and a light detection and ranging (LIDAR). The radar sensor transmits at least one of the radio wave and the light to the surroundings of the vehicle 2, and detects the objects by receiving at least one of the radio waves and the light reflected from the objects, and outputs the result. The objects include fixed objects such as guardrails and buildings, and moving objects such as pedestrians, bicycles, other vehicles, and the like. The result of detection performed by the radar sensor can be handled as three-dimensional image data.

The internal sensor 23 is a sensor that detects a travel state of the vehicle 2. The internal sensor 23 outputs a result of detection as internal sensor data. The internal sensor 23 includes a vehicle speed sensor, an accelerator sensor, and a yaw rate sensor. The vehicle speed sensor is a measurement device that measures a speed of the vehicle 2. As the vehicle speed sensor, for example, a vehicle wheel speed sensor can be used, which is provided on vehicle wheels of the vehicle 2 or on a drive shaft rotating integrally with the vehicle wheels, and measures a rotational speed of the vehicle wheels.

The accelerator sensor is a measurement device that measures an acceleration of the vehicle 2. The accelerator sensor includes, for example, a longitudinal accelerator sensor that measures the acceleration in the longitudinal direction of the vehicle 2. The accelerator sensor may include a lateral accelerator sensor that measures the acceleration in the lateral direction of the vehicle 2. The yaw rate sensor is a measurement device that measures a yaw rate (rotation angular velocity) around the vertical axis at the center of gravity of the vehicle 2. As the yaw rate sensor, for example, a Gyro sensor can be used.

The map database 24 is a database that records map information. The map database 24 is formed, for example, in a recording device such as a hard disk drive (HDD) mounted on the vehicle 2. The map information includes information on the position of the road, information on the shape of the road (for example, curvature information, information on the position of the intersection and the branch. The map information may include traffic regulation information such as a legal speed associated with the position information. The map information may include target object information used for acquiring the information on the position of the vehicle 2. As the target object, road signs, road markings, traffic signals, utility poles, or the like can be used. The map database 24 may be configured in a server that can communicate with the vehicle 2.

The vehicle communication unit 25 is a communication device that controls the wireless communication with the outside of the vehicle 2. The vehicle communication unit 25 transmits and receives various information to and from the remote instruction apparatus 10 via the network N. The vehicle communication unit 25 transmits the external sensor data, the internal sensor data, and a GPS time to the remote instruction apparatus 10 for controlling the image display device 1.

The actuator 26 is a device used for controlling the vehicle 2. The actuator 26 includes a drive actuator, a brake actuator and a steering actuator. The drive actuator controls a driving force of the vehicle 2 by controlling an amount of air (throttle opening degree) supplied to the engine according to a control signal from the autonomous driving ECU 20. If the vehicle 2 is a hybrid vehicle, in addition to the amount of air supplied to the engine, the control signal from the autonomous driving ECU 20 is input to a motor as a power source, and then, the driving force is controlled. If the vehicle 2 is an electric vehicle, the control signal from the autonomous driving ECU 20 is input to a motor as a power source, and then, the driving force is controlled. The motors as the power source in these cases configure the actuator 26.

The brake actuator controls the brake system according to a control signal from the autonomous driving ECU 20 and controls a braking force applied to the wheels of the vehicle 2. For example, a hydraulic brake system can be used as the brake system. The steering actuator controls the driving of an assist motor controlling a steering torque of an electric power steering system according to a control signal from the autonomous driving ECU 20. In this way, the steering actuator controls the steering torque of the vehicle 2.

The autonomous driving ECU 20 performs various functions based on at least one of the result of output from the device and the information included in the device. The autonomous driving ECU 20 includes a vehicle position acquisition unit 200, an external environment recognition unit 201, a travel state recognition unit 202, a remote instruction request determination unit 203, a trajectory generation unit 204, an autonomous driving control unit 205, and an emergency braking determination unit 206.

The vehicle position acquisition unit 200 acquires the information on the position of the vehicle 2 based on the position information from the GPS receiver 21 and the map information in the map database 24. In addition, the vehicle position acquisition unit 200 may acquire the information on the position of the vehicle 2 using the target object information included in the map information in the map database 24 and the result of detection performed by the external sensor 22, using a simultaneous localization and mapping (SLAM) technology. The vehicle position acquisition unit 200 may recognize the lateral position of the vehicle 2 (the position of the vehicle 2 in the lane width direction) relative to a lane using the positional relationship between a lane marking line and the vehicle 2, and may include the lateral position in the position information. The vehicle position acquisition unit 200 may also acquire the information on the position of the vehicle 2 using a known method.

The external environment recognition unit 201 recognizes the external environment of the vehicle 2 based on the result of detection performed by the external sensor 22. The external environment includes a relative position of the surrounding object relative to the vehicle 2. The external environment may include a relative speed and a moving direction of the surrounding object relative to the vehicle 2. The external environment may include types of the objects such as another vehicle, a pedestrian, and a bicycle. The types of the object can be identified using a known method such as pattern matching. The external environment may include a result of recognition of the lane marking lines around the vehicle 2 (lane line recognition). The external environment may include a result of recognition of a lighting state of the traffic signal. The external environment recognition unit 201 can recognize the lighting state of the traffic signal in front of the vehicle 2 based on the camera image by the external sensor 22, for example.

The travel state recognition unit 202 recognizes a travel state of the vehicle 2 based on a result of detection performed by the internal sensor 23. The travel state includes the vehicle speed of the vehicle 2, the acceleration of the vehicle 2, and the yaw rate of the vehicle 2. Specifically, the travel state recognition unit 202 recognizes the vehicle speed of the vehicle 2 based on the vehicle speed information from the vehicle speed sensor. The travel state recognition unit 202 recognizes the acceleration of the vehicle 2 based on the vehicle speed information from the accelerator sensor. The travel state recognition unit 202 recognizes the orientation of the vehicle 2 based on the yaw rate information from the yaw rate sensor.

The remote instruction request determination unit 203 determines whether or not a remote instruction request to the remote operator R is required. The remote instruction request determination unit 203 determines whether or not the remote instruction needs to be requested based on at least one of the information on the position of the vehicle 2 acquired by the vehicle position acquisition unit 200 and the map information in the map database 24, the external environment recognized by the external environment recognition unit 201, and the trajectory generated by the trajectory generation unit 204 described later.

The remote instruction request determination unit 203 determines that the remote instruction request is required when the vehicle 2 is in a remote instruction needed state set in advance. For example, when the vehicle 2 is in a state of turning right at the intersection, the remote instruction request determination unit 203 determines that the remote instruction request is required. When the vehicle 2 is in a state of entering at least one of the intersection with the traffic signal and the intersection with poor visibility, the remote instruction request determination unit 203 may determine that the remote instruction request is required. When the vehicle 2 is in a state of starting a lane change to reach the destination, the remote instruction request determination unit 203 may determine that the remote instruction request is required. When there is an obstacle that requires the offset avoidance in front of the vehicle 2, the remote instruction request determination unit 203 may determine that the remote instruction request is required.

The remote instruction request determination unit 203 recognizes that the vehicle 2 is in the state of turning right at the intersection, the vehicle 2 is in the state of entering the intersection with the traffic signal, or the vehicle 2 is in the state of starting the lane change, from, for example, the information on the position of the vehicle 2, the map information, and the trajectory. In addition, the remote instruction request determination unit 203 can recognize that there is an obstacle that requires the offset avoidance in front of the vehicle 2, based on the external environment of the vehicle 2.

If it is determined that the remote instruction request is required, the remote instruction request determination unit 203 requests the remote instruction apparatus 10 for the remote instruction by the remote operator R. For example, identification information on the vehicle 2 is included in the request for the remote instruction. The remote instruction request determination unit 203 may request for the remote instruction in advance with a time margin. When a distance between the intersection and the like that is the target of the remote instruction and the vehicle 2 is equal to or shorter than a certain distance, the remote instruction request determination unit 203 may determine that the remote instruction request is required. The remaining arrival time may be used instead of the distance.

If it is determined that the remote instruction request is required, the remote instruction request determination unit 203 transmits information on the travel state of the vehicle 2 to the remote instruction apparatus 10. The information on the travel state of the vehicle 2 includes information for the remote operator R to recognize the state of the vehicle 2.

The information on the travel state of the vehicle 2 includes the information on the position of the vehicle 2, external sensor data detected by the external sensor 22, and internal sensor data detected by the internal sensor 23. The external sensor data includes the camera image and the result of detection performed by the laser radar. The internal sensor data includes the vehicle speed of the vehicle 2, the yaw rate of the vehicle 2, the steering angle of the vehicle 2, and the like. The information on the travel state of the vehicle 2 may include information relating to the occupants (presence or absence of the occupants and the number of occupants). The information on the travel state of the vehicle 2 may include trajectory information in accordance with the remote instruction that can be selected by the remote operator R.

The autonomous driving ECU 20 may transmit the information on the travel state of the vehicle 2 to the remote instruction apparatus 10 at a timing set in advance regardless of the result of determination whether or not the remote instruction request is required. The preset timing may be every fixed time, every node of a road on the map, or every event such as when approaching a crosswalk or approaching an intersection.

The trajectory generation unit 204 generates a trajectory used for autonomous driving of the vehicle 2. The trajectory generation unit 204 generates a trajectory for autonomous driving based on a travel route set in advance, the map information, the information on the position of the vehicle 2, the external environment of the vehicle 2, and the travel state of the vehicle 2.

The travel route is a route along which the vehicle 2 travels in autonomous driving. The trajectory generation unit 204 obtains the travel route for autonomous driving based on, for example, a destination, the map information, and the information on the position of the vehicle 2. The travel route may be set by a well-known navigation system. The destination may be set by the occupants of the vehicle 2, or may be automatically suggested by at least one of the autonomous driving ECU 20 and the navigation system.

The trajectory includes a path along which the vehicle travels in autonomous driving and a vehicle speed profile in autonomous driving. The path is a locus that a vehicle in autonomous driving travels on the travel route. The path can be, for example, data of the steering angle change (steering angle profile) of the vehicle 2 according to the position on the travel route. The position on the travel route is, for example, a set longitudinal position set at predetermined intervals (for example, 1 m) in the traveling direction of the travel route. The steering angle profile is data in which a target steering angle is associated with each set longitudinal position.

The trajectory generation unit 204 generates the path along which the vehicle 2 travels based on, for example, the travel route, the map information, the external environment of the vehicle 2, and the travel state of the vehicle 2. The trajectory generation unit 204 generates the path such that, for example, the vehicle 2 passes through the center of lanes included in the travel route (the center in the lane width direction).

The vehicle speed profile is data in which a target vehicle speed is associated with each set longitudinal position, for example. The set longitudinal position may be set based on the travel time of the vehicle 2 instead of the distance. The set longitudinal position may be set as the arrival position of the vehicle after one second and the arrival position of the vehicle after two seconds.

The trajectory generation unit 204 generates the vehicle speed profile based on the path and traffic regulation information such as the legal speed included in the map information, for example. Instead of the legal speed, a preset speed for at least one of the position and the section on the map may be used. The trajectory generation unit 204 generates an autonomous driving trajectory using the path and the vehicle speed profile. The method for the trajectory generation unit 204 to generate the trajectory is not limited to the above-described content, and a known method regarding autonomous driving can be adopted. The same is applied to the contents of the trajectory.

If the remote instruction is requested to the remote instruction apparatus 10 by the remote instruction request determination unit 203, the trajectory generation unit 204 generates the trajectory corresponding to the remote instruction in advance. The content of the remote instruction is determined in advance according to the situation of the vehicle 2. For example, the content of the remote instruction at the time of a right turn at the intersection includes a remote instruction to start the right turn (start progressing) and a remote instruction to wait. The content of the remote instruction at the time of turning right at the intersection may include a remote instruction to stop the right turn and to go straight, or may include a remote instruction to perform the emergency evacuation.

For example, the trajectory generation unit 204 generates a trajectory for the vehicle 2 to turn right at the intersection such that vehicle 2 corresponds to the remote instruction to start the right turn in the situation of right turn at the intersection. The trajectory generation unit 204 may update the trajectory according to the change of the external environment until the remote instruction is received. In addition, if there is a remote instruction to switch from the right turn at intersection to the straight going at the intersection, the trajectory generation unit 204 may generate in advance a trajectory to go straight at the intersection.

If there is a remote instruction to perform the emergency evacuation, the trajectory generation unit 204 may generate a trajectory for the emergency evacuation in advance. The trajectory for the emergency evacuation is generated to stop the vehicle 2 at one of the evacuation spaces set in advance on the map. The trajectory generation unit 204 recognizes the presence or absence of an obstacle on each evacuation space based on, for example, the external environment, and generates a trajectory for the emergency evacuation to stop at the empty evacuation space. The trajectory generation unit 204 does not necessarily need to generate the trajectory in advance, and may generate the trajectory corresponding to the remote instruction after receiving the remote instruction.

The autonomous driving control unit 205 performs the autonomous driving of the vehicle 2. The autonomous driving control unit 205 performs the autonomous driving of the vehicle 2 based on, for example, the external environment of the vehicle 2, the travel state of the vehicle 2, and the trajectory generated by the trajectory generation unit 204. The autonomous driving control unit 205 performs the autonomous driving of the vehicle 2 by transmitting a control signal to the actuator 26.

When the remote instruction is requested to the remote instruction apparatus 10 by the remote instruction request determination unit 203, the autonomous driving control unit 205 waits for the reception of the remote instruction from the remote instruction apparatus 10. When the remote instruction is requested after the vehicle 2 stopped, the autonomous driving control unit 205 maintains the stop state until the remote instruction is received.

When the occupant having a driver's license is on board and the remote instruction is not received even after a waiting time set in advance has elapsed, the autonomous driving control unit 205 may request at least one of a determination and a manual driving by the occupant. If no remote instruction is received even after the waiting time has elapsed, and if at least one of the determination and the manual driving by the occupant is not possible, the autonomous driving control unit 205 may autonomously perform the emergency evacuation.

The emergency braking determination unit 206 determines whether or not the emergency braking is necessary based on at least one of the external environment of vehicle 2 and the result of detection performed by the external sensor 22 (the image by the camera and/or the object information from the radar sensor). For example, when a time to collision (TTC) between the obstacle in front of the vehicle 2 and the vehicle 2 is shorter than a TTC threshold value, the emergency braking determination unit 206 determines that the emergency braking is necessary. The TTC threshold value is a threshold value having a value set in advance. Instead of the time to collision, a time headway (THW) may be used or a distance between the vehicle 2 and the obstacle may be used.

If it is determined that the emergency braking is necessary, the emergency braking determination unit 206 performs the emergency braking by transmitting a control signal to the brake actuator. The determination of the emergency braking is performed independently of the autonomous driving function. The emergency braking determination unit 206 may be formed in an electronic unit different from the autonomous driving ECU 20. The emergency braking may be performed in a so-called pre-crash safety (PCS) system.

Configuration of Remote Instruction Apparatus

Figure 2:
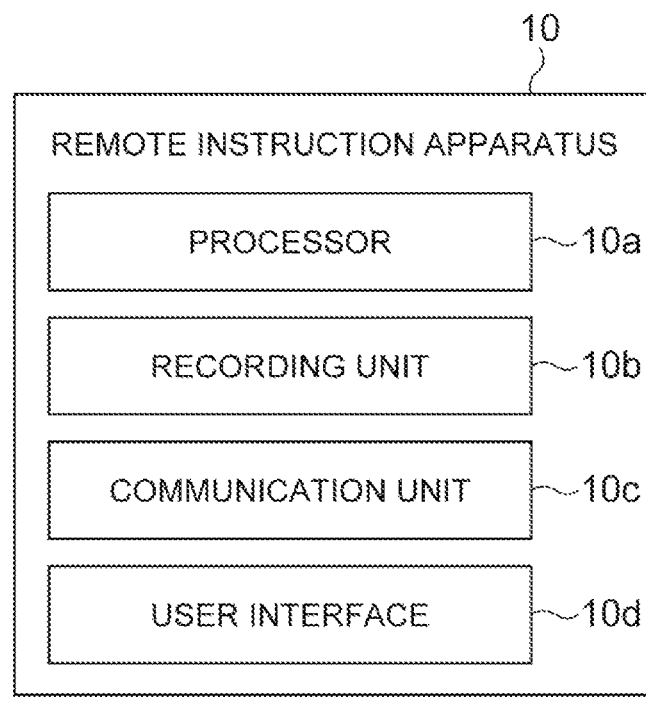
FIG. 2 is a diagram illustrating an example of a hardware configuration of a remote instruction apparatus.

FIG. 2 is a diagram illustrating an example of a hardware configuration of the remote instruction apparatus 10. As illustrated in FIG. 2, the remote instruction apparatus 10 is configured as a general computer including a processor 10a, a recording unit 10b, a communication unit 10c, and a user interface 10d.

The processor 10a controls the remote instruction apparatus 10 by operating various operating systems. The processor 10a is an arithmetic unit such as a CPU including a control device, an arithmetic device, and a register. The processor 10a performs an overall management of the recording unit 10b, the communication unit 10c, and the user interface 10d. The recording unit 10b includes at least one of a memory and a storage. The memory is a recording medium such as ROM and RAM. The storage is a recording medium such as an HDD.

The communication unit 10c is a communication device for performing communication via the network N. As the communication unit 10c, a network device, a network controller, a network card, or the like can be used. The user interface 10d is an input/output unit for a user such as an administrator. The user interface 10d includes an output device such as a display and a speaker, and an input device such as a touch panel. The remote instruction apparatus 10 does not necessarily need to be provided in a facility, and may be mounted on a moving body such as a vehicle.

Configuration and Function of Image Display Device

Since the image display device 1 is included in the remote instruction apparatus 10, the hardware is the same as that of the remote instruction apparatus 10. The hardware of the image display device 1 is not limited to have the configuration same as or common to the remote instruction apparatus 10, and may have the configuration illustrated in FIG. 2 while being separated from the remote instruction apparatus 10. FIG. 3 is a block diagram illustrating the functions of the image display device. As illustrated in FIG. 3, the image display device 1 includes a communication unit 11 as a communication function. The function of the communication unit 11 is realized by the processor 10a and the communication unit 10c.

The communication unit 11 is connected to the vehicle communication unit 25 of the vehicle 2 via the network N. The vehicle communication unit 25 of the vehicle 2 includes an external sensor data transmission unit 250, an internal sensor data transmission unit 251, and a time transmission unit 252 in order to transmit the external sensor data, the internal sensor data, and the GPS time. The communication unit 11 includes an external sensor data reception unit 110 (an example of an external sensor data acquisition unit), an internal sensor data reception unit 111 (an example of an internal sensor data acquisition unit) and a time reception unit 112 in order to receive the external sensor data, the internal sensor data, and the GPS time. The external sensor data reception unit 110 acquires the external sensor data detected by the external sensor 22 of the vehicle 2 at a first time point from the external sensor data transmission unit 250 of the vehicle 2 via the network N. The internal sensor data reception unit 111 acquires the internal sensor data detected by the internal sensor 23 of the vehicle 2 at the first time point from the internal sensor data transmission unit 251 of the vehicle 2 via the network N. The first time point is a detection time point by the external sensor 22 and the internal sensor 23. The time reception unit 112 acquires the GPS time from the time transmission unit 252 of the vehicle 2 via the network N.

The image display device 1 includes a delay time calculation unit 12 (an example of a calculation unit), an assist information generation unit 13 (an example of a determination unit), and a display control unit 14, in addition to the communication unit 11.

The delay time calculation unit 12 calculates a delay time of the communication with the vehicle 2. The delay time calculation unit 12 compares the GPS time acquired by the time reception unit 112 with the GPS time acquired by the GPS receiver (not illustrated) of the image display device 1 to calculate the communication delay time.

The assist information generation unit 13 generates assist information that is information for assisting the determination by the remote operator R. The assist information generation unit 13 determines the position of the vehicle 2 at a second time point that is a future time point after a predetermined time has elapsed from the first time point. The future time point is a time point that is ahead of the current time point. Based on the processing time of the image display device 1, the first time point is a past time point that is substantially close to the current time point, and the second time point is a future time point that is ahead of the current time point. A plurality of second time points may be set. The assist information generation unit 13 determines the position of the vehicle 2 at the second time point based on the sensor data at the first time point acquired by the internal sensor data reception unit 111. As an example, the assist information generation unit 13 determines the position of the vehicle 2 at the second time point based on the sensor data at the first time point under the assumption that there is no change in the remote instruction by the remote operator R from the first time point to the second time point. For example, if the vehicle speed at the first time point is 60 km/h, the assist information generation unit 13 assumes that the vehicle speed of 60 km/h is maintained until the second time point. For example, if the vehicle is decelerating at the first time point, the assist information generation unit 13 assumes that the vehicle decelerates at the same acceleration until the second time point. As described above, the assist information generation unit 13 determines the future position of the vehicle 2 when the travel state of the vehicle 2 does not change.

The assist information generation unit 13 may determine an acceptable range of the position of the vehicle 2 at the second time point based on the delay time calculated by the delay time calculation unit 12. For example, when the vehicle speed is 60 km/h and the delay time is 0.1 second, there occurs an error of about 1.7 m. The assist information generation unit 13 determines, for example, a maximum delay position obtained by subtracting the error distance from the position of the vehicle 2 at the second time point determined based on the sensor data at the first time point. The assist information generation unit 13 may determine the range from the maximum delay position to the position of the vehicle 2 at the second time point as the acceptable range. The assist information generation unit 13 may determine the acceptable range using the position of the vehicle 2 at the second time point, the error distance, and the normal distribution.

The display control unit 14 displays a monitoring image indicating the surroundings of the vehicle 2 on the operator interface 3 based on the external sensor data at the first time point acquired by the external sensor data reception unit 110. The operator interface 3 includes a display device 30 (an example of a display unit). The display control unit 14 is connected to the display device 30. The monitoring image may be any image as long as the monitoring image is an image displayed on the screen of the display device 30 and the image that indicates the surroundings of the vehicle 2. For example, the monitoring image may be at least one of a bird's-eye view of the vehicle 2 from directly above and a bird's-eye view of the vehicle 2 from obliquely above, or may be at least one of the camera image acquired by the external sensor 22 and the image itself from the radar sensor. In addition to the display device 30, the operator interface 3 may include an instruction reception unit 31 for operating the remote operator R.

The display control unit 14 superimposes an object indicating the position of the vehicle 2 at the second time point at the position on the monitoring image corresponding to the position of the vehicle 2 at the second time point determined by the assist information generation unit 13. The object indicating the position of the vehicle 2 at the second time point is, for example, a guideline object. For example, the guideline object is an object such as a solid line, a dashed line, and a dotted line, and can be given various colors. The object indicating the position of the vehicle 2 at the second time point is not limited thereto. For example, the object indicating the position of the vehicle 2 at the second time point may be a circle or a rectangle.

Figure 4A:
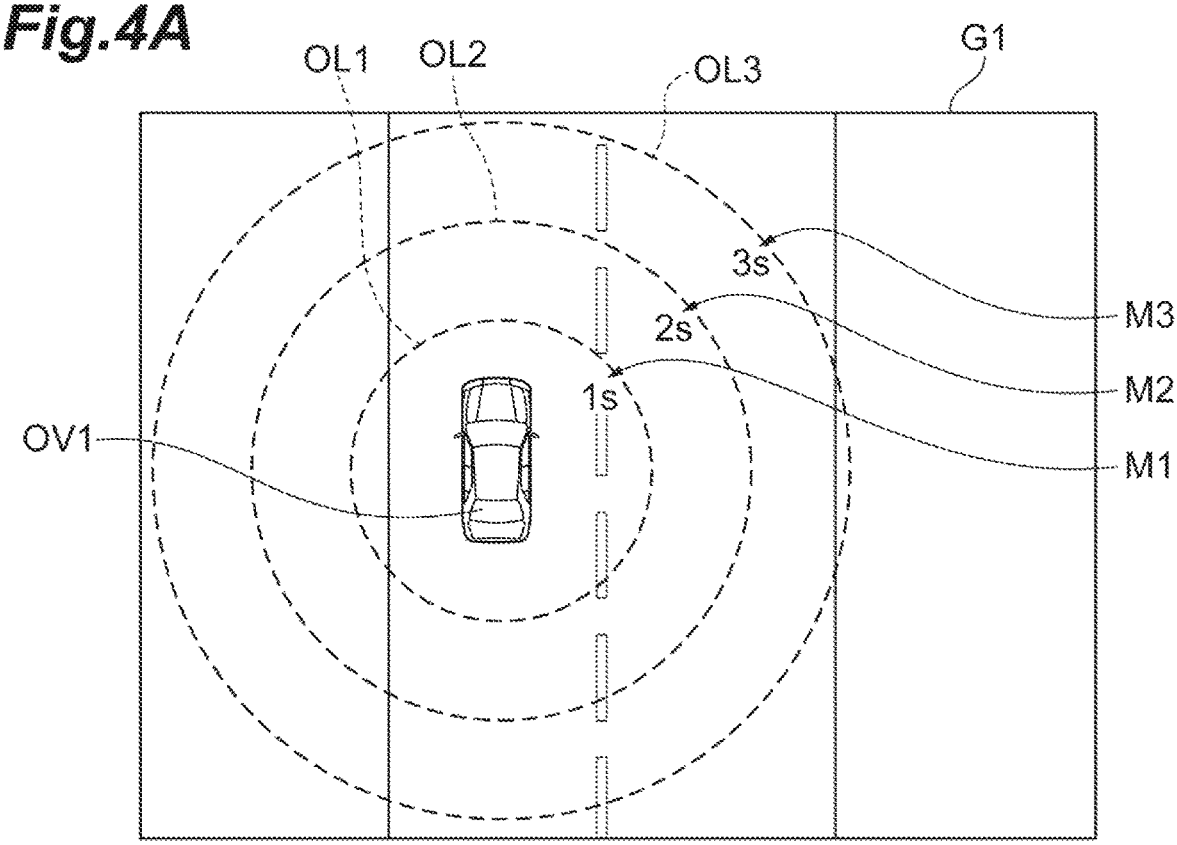
FIG. 4A is an example of a monitoring image in which guideline objects are superimposed.

FIG. 4A illustrates an example of the monitoring image on which a guideline object is superimposed. A monitoring image G1 in FIG. 4A is a bird's-eye view in which a vehicle object OV1 indicating the vehicle 2 is positioned at the center of the screen. As an example, the assist information generation unit 13 generates three positions of the vehicle 2 at the second time point, that is, one second, two seconds, and three seconds after the current time point. The display control unit 14 displays each guideline object on the monitoring image G1 based on three positions of vehicle 2 at the second time point determined by the assist information generation unit 13 in a superimposed manner. For example, the display control unit 14 displays a line object OL1 surrounding the vehicle 2 indicating the position of the vehicle 2 after one second on the monitoring image G1 in a superimposed manner. The display control unit 14 can display an object M1 indicating information relating to the second time point (for example, an elapsed time from the current time point) on the screen position corresponding to the line object OL1 in a superimposes manner. Similarly, the display control unit 14 displays a line object OL2 indicating the position of the vehicle 2 after two seconds and an object M2 relating to the corresponding second time point in a superimposed manner. The display control unit 14 displays a line object OL3 indicating the position of the vehicle 2 after three seconds and an object M3 relating to the corresponding second time point in a superimposed manner.

Figure 4B:
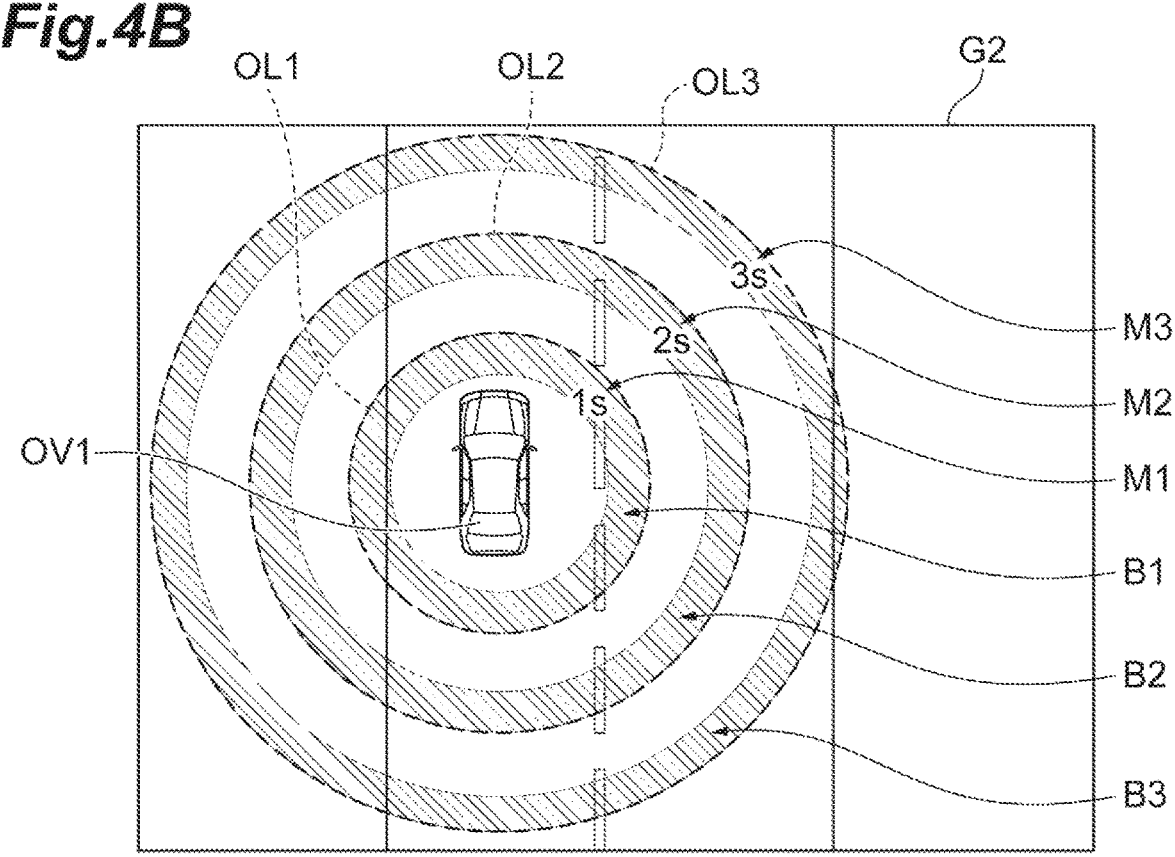
FIG. 4B is an example of a monitoring image in which the objects on the guidelines and objects indicating delay are superimposed.

The display control unit 14 may display an object relating to the delay time on the monitoring image in a superimposed manner. For example, the display control unit 14 may display the acceptable range determined by the assist information generation unit 13 on the monitoring image in a superimposed manner as the object. The object indicating the acceptable range may be a figure with high transparency, or may be given various colors. FIG. 4B illustrates an example of a monitoring image in which a guideline object and an object indicating a delay are superimposed. A monitoring image G2 in FIG. 4B is a bird's-eye view in which the vehicle object OV1 indicating the vehicle 2 is positioned at the center of the screen. Hereinafter, a case where an object indicating the delay is additionally displayed in the monitoring image in FIG. 4A. As an example, the assist information generation unit 13 determines the acceptable range for each of three second time points, that is, one second, two seconds, and three seconds after the current time point. The display control unit 14 displays each object on the monitoring image G2 in a superimposed manner based on the acceptable ranges corresponding to the three second time points from the assist information generation unit 13. For example, the display control unit 14 displays an object B1 extending in the line width direction of the line object OL1 in a superimposed manner to indicate the acceptable range of the vehicle 2 after one second. Similarly, the display control unit 14 displays an object B2 extending in the line width direction of the line object OL2 in a superimposed manner to indicate the acceptable range of the vehicle 2 after two seconds. The display control unit 14 displays an object B3 extending in the line width direction of the line object OL3 in a superimposed manner to indicate the acceptable range of the vehicle 2 after three seconds.

The display control unit 14 may indicate the magnitude of the delay by lengths of the objects B1 to B3 in the line width direction. For example, the display control unit 14 determines a degree of delay using the delay time calculated by the assist information generation unit 13. The degree of delay is a value indicating that the longer the delay time, the greater the delay. The degree of delay may be an absolute value of the delay time. The display control unit 14 may determine the degree of delay using the variance value of the delay time calculated by the assist information generation unit 13 within a predetermined period. In this case, the degree of delay is a value indicating that the larger the variance value, the larger the delay. The degree of delay may be the variance value itself. Alternatively, the degree of delay may be a weighted sum or a weighted average of the degree of delay of the delay time and the degree of delay of the variance value. Alternatively, the degree of delay may be determined based on the relationship between the absolute value of the delay time and the variance value. Specifically, if the absolute value of the delay time is shorter than a predetermined threshold value, the degree of delay may be determined to be small regardless of the variance value of the delay time (even if the variance value of the delay time is large), and on the other hand, if the absolute value of the delay time is equal to or longer than the predetermined threshold value, the degree of delay may be determined larger as the variance value of the delay time increases and may be determined smaller as the variance value of the delay time decreases. As described above, the degree of delay is defined based on at least one of the absolute value of the delay time and the variance value within a predetermined time. The display control unit 14 can express the magnitude of the delay by changing the lengths of the objects B1 to B3 in the line width direction as the degree of delay increases.

The display control unit 14 may switch the monitoring image G1 in FIG. 4A and the monitoring image G2 in FIG. 4B according to the conditions. For example, the display control unit 14 displays the monitoring image G1 in FIG. 4A on the display device 30 when the degree of delay is smaller than the threshold value, and displays the monitoring image G2 in FIG. 4B on the display device 30 when the degree of delay is equal to or greater than the threshold value. The threshold value is a value set in advance for determining the degree of delay. For example, the threshold value may be determined by an interval of the guidelines displayed on the monitoring image and the setting ratio. For example, in an example where the delay time is the degree of delay, when the interval of the guidelines is one second and when the setting ratio is 0.5, the threshold value is set to 0.5 seconds. In this case, the display control unit 14 displays the monitoring image G1 when the delay time is shorter than 0.5 seconds, and displays the monitoring image G2 when the delay time is equal to or longer than 0.5 seconds.

FIG. 5A is another example of a monitoring image in which the guideline objects are superimposed. As described above, the guideline objects can be expressed in various forms. In a monitoring image G3 in FIG. 5A, a vehicle object OV1 indicating the vehicle 2 and a scheduled path PA of the vehicle 2 are illustrated. For such a display, the image display device 1 acquires the scheduled path from the vehicle 2 via the communication unit 11 in advance. The display control unit 14 displays each guideline object on the scheduled path PA in the monitoring image G1 in a superimposed manner based on five positions of the vehicle 2 at the second time point determined by the assist information generation unit 13. For example, the display control unit 14 displays a line object OL1 indicating the position of the vehicle 2 after one second on the monitoring image G1 in a superimposed manner. The display control unit 14 can display an object M1 indicating information relating to the second time point (for example, an elapsed time from the current time point) on the screen position corresponding to the line object OL1 in a superimposed manner. At this time, the display control unit 14 may refer to the map information in order for the shape of the object. Similarly, the display control unit 14 displays a line object OL2 indicating the position of the vehicle 2 after two seconds and an object M2 relating to the corresponding second time point in a superimposed manner. The display control unit 14 displays a line object OL3 indicating the position of the vehicle 2 after three seconds and an object M3 relating to the corresponding second time point in a superimposed manner. The display control unit 14 displays a line object OL4 indicating the position of the vehicle 2 after four seconds and an object M4 relating to the corresponding second time point in a superimposed manner. The display control unit 14 displays a line object OL5 indicating the position of the vehicle 2 after five seconds and an object M5 relating to the corresponding second time point in a superimposed manner.

FIG. 5B is another example of a monitoring image in which the guideline objects and the objects indicating the delay are superimposed. As described in FIG. 4B, a monitoring image G4 in FIG. 5B is a screen in which objects B1 to B5 indicating the delay are additionally displayed on the monitoring image G3 in FIG. 5A. The method of setting the objects B1 to B5 and the method of switching the monitoring images are the same as those described above.

Operation of the Image Display Device

Figure 6:
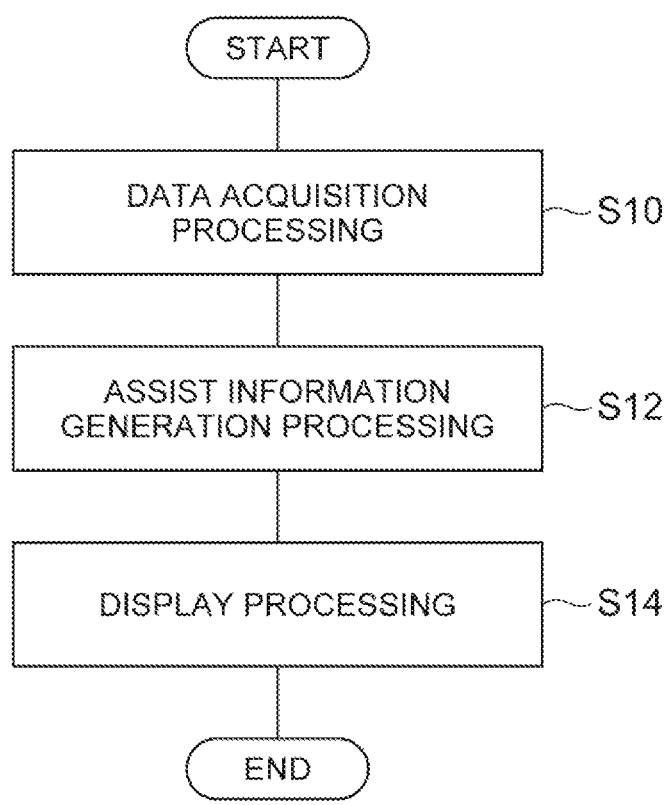
FIG. 6 is a flowchart illustrating an example of display processing by the image display device.

FIG. 6 is a flowchart illustrating an example of display processing by the image display device. The flowchart illustrated in FIG. 6 is started at a timing when an instruction to start the display function of the image display device 1 is issued.

First, as data acquisition processing (S10), the external sensor data reception unit 110 acquires the external sensor data detected at the first time point from the vehicle 2. The internal sensor data reception unit 111 acquires the internal sensor data at the first time point from the vehicle 2.

Next, as assist information generation processing (S12), the assist information generation unit 13 determines the position of the vehicle 2 at the second time point assuming that there is no change in the remote instruction by the remote operator R from the first time point to the second time point.

Next, as display processing (S14), the display control unit 14 displays a monitoring image indicating the surroundings of the vehicle 2 on the display device 30 based on the external sensor data at the first time point, and superimposes an object indicating the position of the vehicle 2 at the second time point at the position on the monitoring image corresponding to the position of vehicle 2 at the second time point determined by the assist information generation unit 13.

When the display processing (S14) ends, the flowchart illustrated in FIG. 6 ends. By executing the flowchart illustrated in FIG. 6, the image display device 1 can appropriately notify the remote operator R of the future position of the vehicle 2. After the execution of the flowchart ends, the image display device 1 starts to execute the flowchart from the beginning until an instruction to end the display function is issued.

Figure 7:
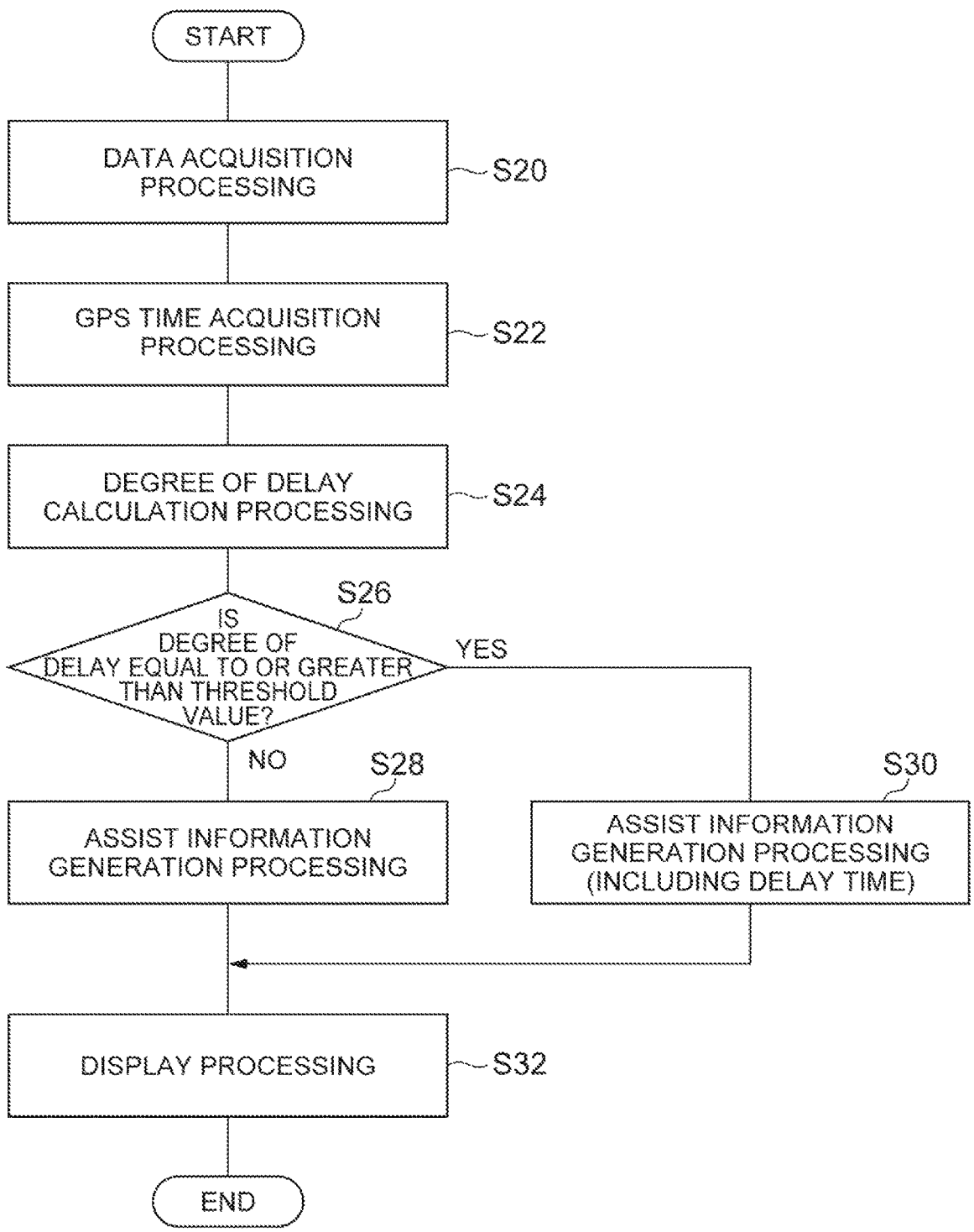
FIG. 7 is a flowchart illustrating another example of display processing by the image display device.

FIG. 7 is a flowchart illustrating another example of the display processing by the image display device. In the flowchart illustrated in FIG. 7, the image display device 1 notifies the remote operator R of the delay time according to the condition. The flowchart illustrated in FIG. 7 is started at a timing when an instruction to start the display function of the image display device 1 is issued.

First, as data acquisition processing (S20), the external sensor data reception unit 110 acquires the external sensor data detected at the first time point from the vehicle 2. The internal sensor data reception unit 111 acquires the internal sensor data at the first time point from the vehicle 2.

Next, as the GPS time acquisition processing (S22), the time reception unit 112 acquires the GPS time from the vehicle 2. The delay time calculation unit 12 acquires its own GPS time from a GPS receiver (not illustrated) of the image display device 1.

Next, as degree of delay calculation processing (S24), the delay time calculation unit 12 compares the GPS time of the vehicle 2 with its own GPS time to calculate the degree of delay. As an example, the delay time calculation unit 12 uses the delay time, which is a difference between the GPS time of the vehicle 2 and its own GPS time, as the degree of delay. The delay time calculation unit 12 may calculate a difference between the GPS time of the vehicle 2 and its own GPS time during a predetermined time, and may use the variance value of the difference as the degree of delay.

Next, as determination processing (S26), the assist information generation unit 13 determines whether or not the degree of delay is equal to or greater than a threshold value. As assist information generation processing (S28), if it is determined that the degree of delay is not equal to or greater than the threshold value, the assist information generation unit 13 determines the position of the vehicle 2 at the second time point assuming that there is no change in the remote instruction by the remote operator R from the first time point to the second time point. As assist information generation processing (S30), if the degree of delay is equal to or greater than the threshold value, the assist information generation unit 13 determines the position of vehicle 2 at the second time point assuming that there is no change in the remote instruction by the remote operator R from the first time point to the second time point, and determines the acceptable range of the vehicle 2 based on the delay time.

When the assist information generation processing (at least one of S28 and S30) ends, as display processing (S32), the display control unit 14 displays a monitoring image indicating the surroundings of the vehicle 2 on the display device 30 based on the external sensor data at the first time point, and superimposes the object indicating the position of vehicle 2 at the second time point at the position on the monitoring image corresponding to the position of vehicle 2 at the second time point determined by assist information generation unit 13. When the acceptable range of the vehicle 2 is determined by the assist information generation unit 13, the display control unit 14 further displays the object indicating the acceptable range of the vehicle 2 on the monitoring image in a superimposed manner.

When the display processing (S32) ends, the flowchart illustrated in FIG. 7 ends. By executing the flowchart illustrated in FIG. 7, the image display device 1 can notify the remote operator R of the delay time depending on the conditions. After the execution of the flowchart ends, the image display device 1 starts to execute the flowchart from the beginning until an instruction to end the display function is issued.

Summary of Embodiment

In the image display device 1 according to the embodiment, the position of the vehicle 2 at the second time point in a case when there is no change in the remote instruction by the remote operator R from the first time point to the second time point is calculated based on the internal sensor data at the first time point detected by the internal sensor 23 of the vehicle 2. The calculated position of the vehicle 2 at the second time point is displayed on the monitoring image displayed based on the external sensor data at the first time point as an object provided in a superimposed manner to be provided to the remote operator R. For this reason, the image display device 1 can notify the remote operator R of the information that can be used for determining whether or not to maintain the vehicle state at the first time point up to the second time point.

The image display device 1 can notify the remote operator R of an occurrence of the communication delay and the effect of the delay on the position of the vehicle at the second time point. The image display device 1 does not notify the remote operator R when the degree of delay is small, and can notify the remote operator R when the degree of delay is large. The image display device 1 can notify the remote operator R of the degree of delay using the guideline object and an object extending in the line width direction.

The embodiment of the present disclosure has been described above, but the present disclosure is not limited to the above-described embodiment. The present disclosure can be implemented in various forms including various modifications and improvements based on the knowledge of those skilled in the art, including the above-described embodiment.

Modification Example

Display of Another Vehicle

The image display device 1 may display information relating to another vehicle existing around the vehicle 2 on the display device 30. The image display device 1 recognizes another vehicle based on the external sensor data detected by the external sensor 22, and displays the assist information displayed on the vehicle 2 to the other vehicle.

Figure 8A:
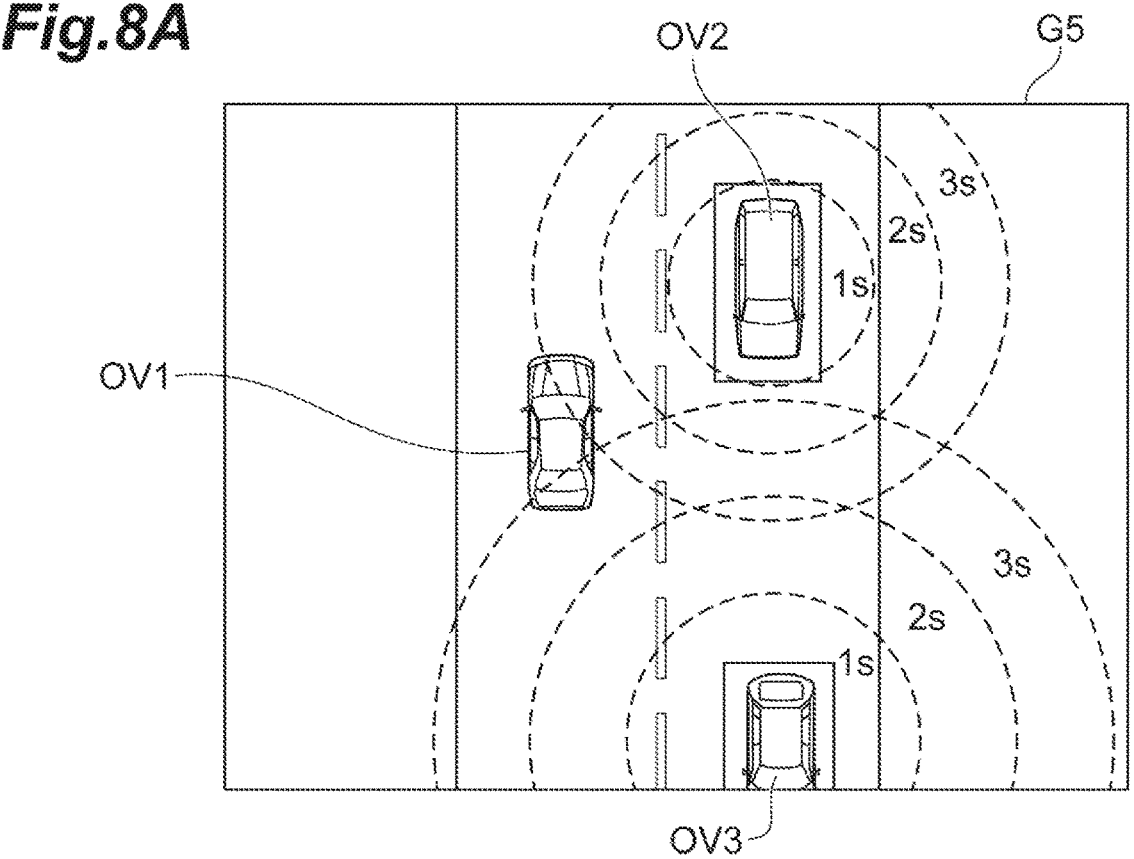
FIG. 8A is an example of a monitoring image in which guideline objects relating to another vehicle are superimposed.

FIG. 8A is an example of a monitoring image in which guideline objects relating to another vehicle are superimposed. The monitoring image G5 in FIG. 8A is a bird's-eye view including vehicle objects OV2 and OV3 indicating other vehicles around the vehicle 2 in addition to the vehicle object OV1 indicating the vehicle 2. The assist information generation unit 13 generates, as an example, the positions of other vehicles at three of the second time points, that is, one second, two seconds, and three seconds after the current time point. The display control unit 14 displays each guideline object on the monitoring image G5 in a superimposed manner based on the three positions of other vehicles at the second time points determined by the assist information generation unit 13. For example, the display control unit 14 displays the line objects surrounding other vehicles on the monitoring image G5 in a superimposed manner to indicate the position of other vehicles after one second. The display control unit 14 can display the object indicating the information relating to the second time point (that is, elapsed time from the current time point) on the screen position corresponding to the line object in a superimposes manner. Similarly, the display control unit 14 displays the line object indicating the position of other vehicle after two seconds and the object relating to the corresponding second time point in a superimposed manner. The display control unit 14 displays the line object indicating the position of the other vehicles after three seconds and the object relating to the corresponding second time point in a superimposed manner.

In FIG. 8A, the assist information is displayed for all the other vehicles existing around the vehicle 2, but the display of the assist information only for a specific other vehicle may be performed. In FIG. 8A, an object extending in the line width direction of the line object may be displayed, and the display may be performed in consideration of the delay time.

Figure 8B:
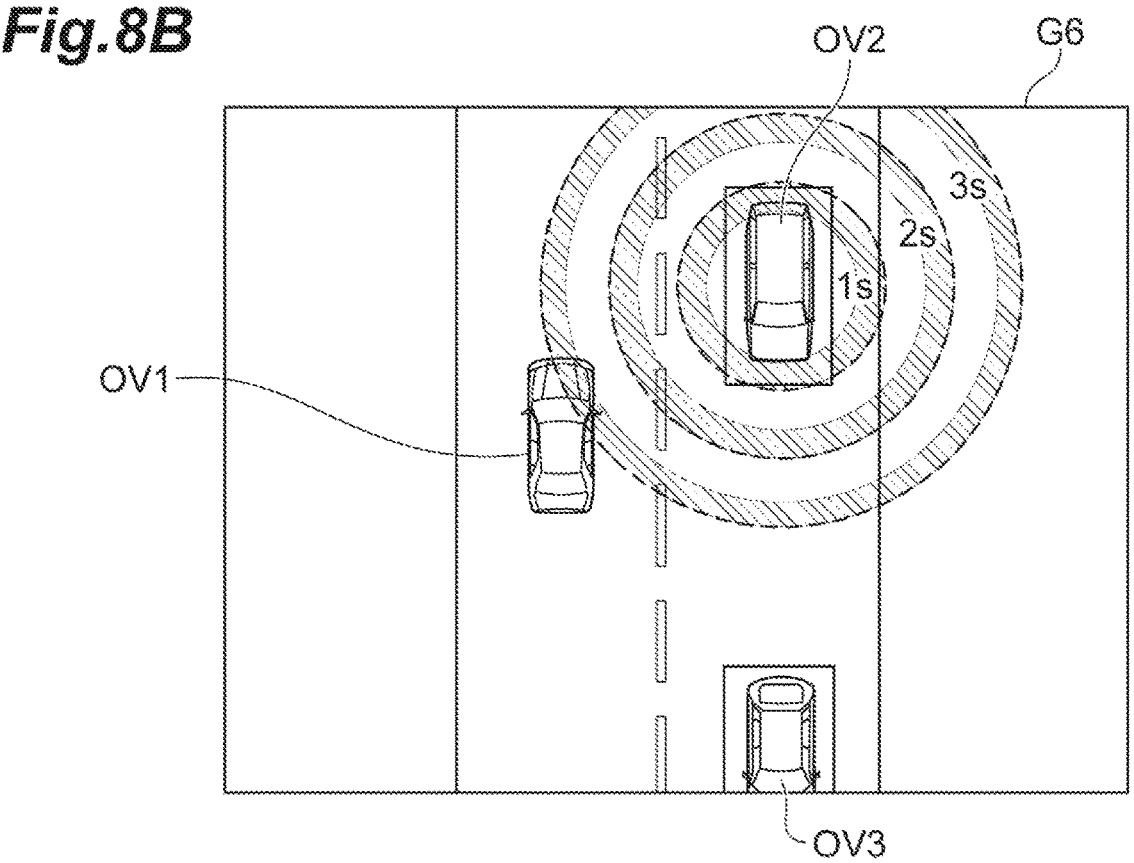
FIG. 8B is an example of a monitoring image in which guideline objects relating to a specific another vehicle and the objects indicating the delay are superimposed.

FIG. 8B is an example of a monitoring image in which guideline objects relating to a specific another vehicle and the objects indicating the delay are superimposed. In a monitoring image G6 in FIG. 8B, the vehicle object OV2 is selected as a display target vehicle, and the assist information only for the vehicle object OV2 is displayed. The image display device 1 selects the display target vehicle by executing the following flowchart in FIG. 9.

Figure 9:
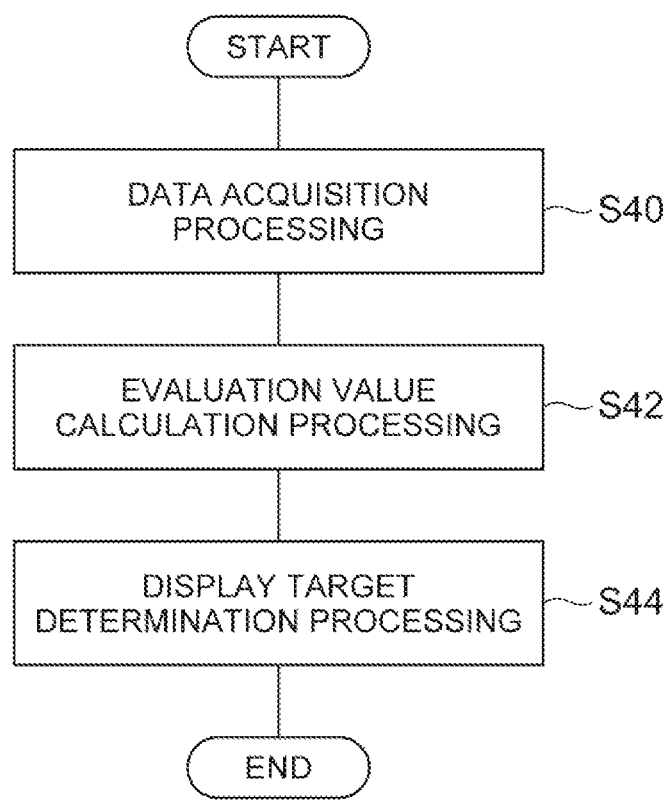
FIG. 9 is a flowchart illustrating an example of determination processing by the image display device.

FIG. 9 is a flowchart illustrating an example of determination processing by the image display device. The flowchart illustrated in FIG. 9 is started at a timing when an instruction to start the display function of the image display device 1 is issued.

First, as data acquisition processing (S40), the external sensor data reception unit 110 acquires the external sensor data detected at the first time point by the external sensor 22 from the vehicle 2.

Next, as evaluation value calculation processing (S42), the image display device 1 recognizes the position of another vehicle based on the external sensor data. The image display device 1 calculates an evaluation value for each recognized another vehicle. The evaluation value is an index indicating a safety, and as an example, is a value indicating whether the effect on the behavior of the vehicle 2 is large or not. The evaluation value indicates a fact that the effect on the behavior of vehicle 2 increases as the value increases. That is, the safety decreases as the evaluation value increases. For example, the image display device 1 calculates the evaluation value by obtaining weighted sum of the relative speed, the relative yaw angle, the relative distance, and the like between the vehicle 2 and the target other vehicle.

The weighted sum may include a term corresponding to the vehicle type of the target other vehicle.

Next, as display target determination processing (S44), the image display device 1 determines the other vehicle to be displayed based on the evaluation value calculated for each of other vehicles. The image display device 1 selects the other vehicle having the highest evaluation value.

When the display target determination processing (S44) ends, the flowchart illustrated in FIG. 9 ends. After the flowchart illustrated in FIG. 9 ends, the assist information for the other vehicle to be displayed is generated and displayed. The processing for the generation and display of the assist information are the same as those in the flowcharts in FIG. 6 and FIG. 7. By executing the flowchart illustrated in FIG. 9, the image display device 1 can select the other vehicle having low safety from a plurality of other vehicles and display the assist information. After the execution of the flowchart ends, the image display device 1 starts to execute the flowchart from the beginning until an instruction to end the display function is issued.

Modification Example of Display

Figure 10A:
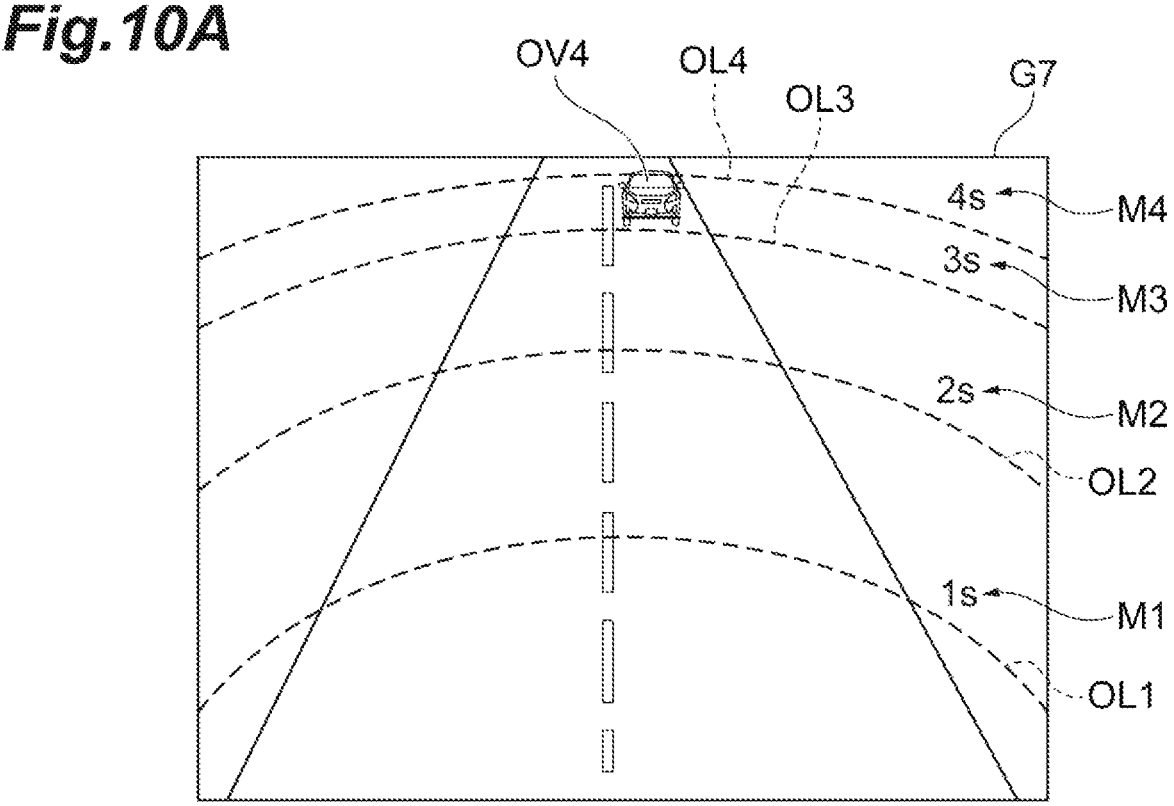
FIG. 10A is an example of a monitoring image in which guideline objects are superimposed.
Figure 10B:
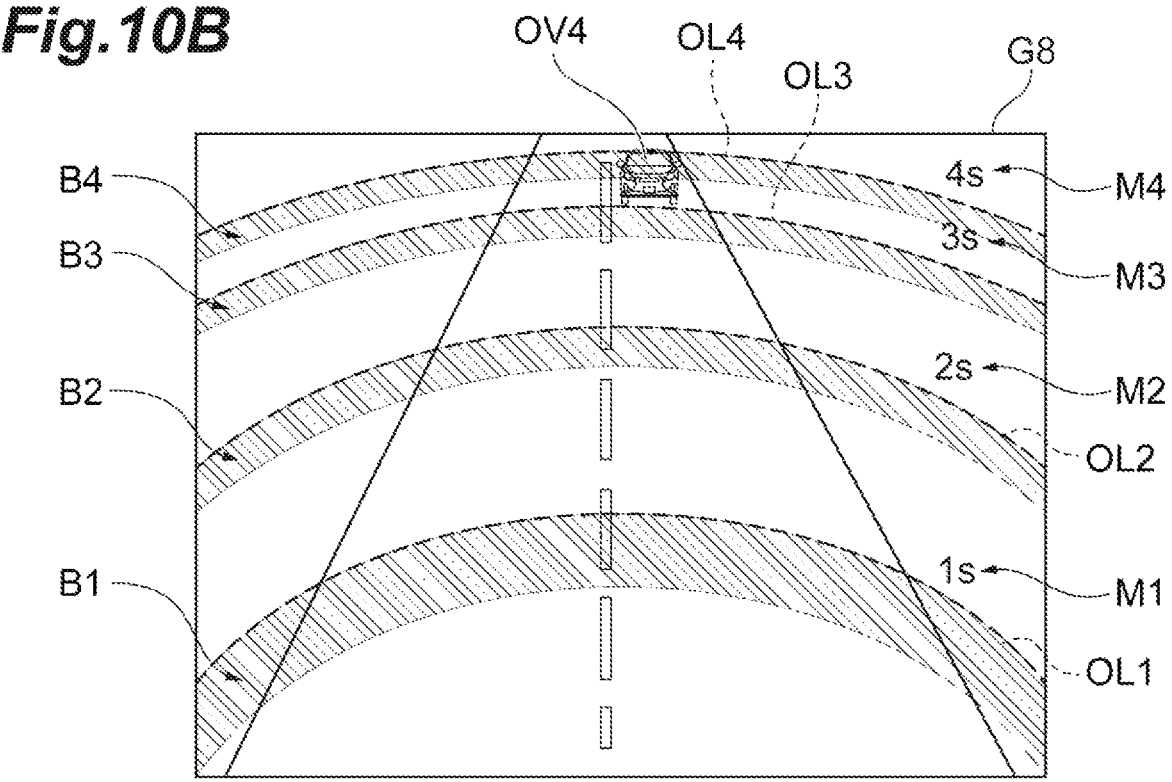
FIG. 10B is another example of a monitoring image in which the guideline object and the object indicating the delay are superimposed.

In the embodiment, the display control unit 14 displays the bird's-eye view image on the display device 30, but may display the camera image itself. FIG. 10A illustrates another example of a monitoring image in which a guideline object is superimposed. As illustrated in FIG. 10A, a monitoring image G7 is a camera image, and the line objects OL1 to OL4 indicating the positions of the future vehicle 2 and objects M1 to M4 relating to the corresponding time points are displayed in a superimposed manner. FIG. 10B is another example of a monitoring image in which the guideline object and the object indicating the delay are superimposed. As illustrated in FIG. 10B, a monitoring image G8 is a camera image, and the line objects OL1 to OL4 indicating the future positions of the vehicles 2, objects M1 to M4 relating to the corresponding time points, and objects B1 to B4 extending according to the delay time in the line width direction of the line objects OL1 to OL4 are displayed in a superimposed manner. As described above, the image display device 1 may superimpose the assist information on the camera image.

In the modification example relating to the display of another vehicle, the display control unit 14 displays the line object indicating the future position of the other vehicle, but is not limited thereto. For example, the display control unit 14 may display the line object indicating the TTC between the vehicle 2 and the target other vehicle.

Modification Example of Configuration

The vehicle 2 is not limited to the autonomous driving vehicle as long as the vehicle 2 is a vehicle capable of the remote instruction. The vehicle 2 does not need to have a map database. The image display device 1 may not include the time reception unit 112 and the delay time calculation unit 12 if the display of the delay time is omitted. In addition, the image display device 1 may use the time acquired from a network time protocol (NTP) server instead of the GPS time.

What is claimed is:

1. An image display device connected to a display device that displays information to a remote operator that remotely instructs a vehicle, comprising:
a processor configured to:
acquire external sensor data detected at a first time point by an external sensor that detects information on an external environment of the vehicle from the vehicle;
acquire internal sensor data detected at the first time point by an internal sensor that detects a travel state of the vehicle from the vehicle;
determine a position of the vehicle at a second time point that is a future time point after a predetermined time has elapsed from the first time point, based on the internal sensor data at the first time point;
display a monitoring image indicating surroundings of the vehicle on the display device based on the external sensor data at the first time point;
superimpose an object indicating the position of the vehicle at the second time point at a position on the monitoring image corresponding to the position of the vehicle at the second time point,
calculate a delay time of communication with the vehicle;
determine an acceptable range of the position of the vehicle at the second time point based on the delay time; and
superimpose an object indicating the acceptable range at a position on the monitoring image corresponding to the acceptable range.

2. The image display device according to claim 1, wherein the processor is configured to superimpose the object indicating the acceptable range at the position on the monitoring image corresponding to the acceptable range when a degree of delay is equal to or greater than a threshold value, and the degree of delay is defined based on at least one of an absolute value of the delay time and a variance value within a predetermined time and indicating that the delay increases as a value increases.

3. The image display device according to claim 2, wherein:
the object indicating the position of the vehicle at the second time point is a guideline object,
the object indicating the acceptable range is an object extending in a line width direction of the guideline object, and
the processor is configured to increase a length of the object indicating the acceptable range in the line width direction as the degree of delay increases.

4. The image display device according to claim 1, wherein the processor is configured to:
detect another vehicle existing around the vehicle based on the external sensor data at the first time point,
determine a position of the other vehicle at the second time point, and
superimpose an object indicating the position of the other vehicle at the second time point at a position on the monitoring image corresponding to the position of the other vehicle at the second time point.

\* \* \* \* \*